United States Patent Office

Re. 25,661
Reissued Oct. 13, 1964

25,661

PROCESS FOR COATING PARTICLES WITH A THERMOSETTING PHENOLIC RESIN

Frank W. Less, Kenmore, Jay C. Searer, Snyder, and Eugene C. Roeck, Williamsville, N.Y., assignors to Hooker Chemical Corporation, Niagara Falls, N.Y., a corporation of New York No Drawing. Original No. 2,965,514, dated Dec. 20, 1960, Ser. No. 527,408, Aug. 9, 1955. Application for reissue Nov. 29, 1962, Ser. No. 242,043
17 Claims. (Cl. 117—100)

Matter enclosed in heavy brackets [ ] appears in the original patent but forms no part of this reissue specification; matter printed in italics indicates the additions made by reissue.

This invention relates to a process for the making of phenolic resin molding compositions. More specifically, it refers to a new process for the production of a phenolic resin molding composition wherein the inert filler particles of the composition are coated with a phenolic resin composition.

A great many uses have been found for phenolic resins. These uses may generally be divided into two main categories. One is the use of the resin itself, either in granulated form, pulverized form, in liquid form, or in solution as a cement. The second main category is the use of the phenolic resins as binders in conjunction with various inert fillers, to form compositions that may be cured into infusible, insoluble, solid products. It is with the latter type of use that the present invention is mainly concerned. This category may still be further subdivided into two groups. In the first group there are those in which the phenolic resin comprises a major or at least a large proportion of the total composition. In this group the percentage of resin may vary from about 35 percent to about 90 percent of the weight of the total composition. The second group is made up of materials in which the resin binder constitutes a minor proportion of the total composition. Here the percentage of resin may vary from less than one percent to about 35 percent. Although the resin of the present invention may beneficially be used as a binder in both groups of molding compositions, it can be used to best advantage as a binder to form those compositions in which the resin constitutes a minor component. Among the various compositions falling into this group are those which may be used for shell molding, woodwaste boards, Fiberglas mat, and grinding wheels. The shell molding composition comprises a major proportion of sand and a minor proportion of phenolic resin. The woodwaste type of composition comprises a major component of sawdust and a minor component of phenolic resins. The glass mat type of composition comprises a major proportion of Fiberglas and a minor proportion of phenolic resin. The grinding wheel composition comprises a major proportion of abrasive grit and a minor proportion of a phenolic resin binder.

In FIAT final Report No. 1168 entitled, "The C Process of Making Molds and Cores for Foundry Use," by William W. McCulloch, Office of Technical Services, May 30, 1947, there is described a process for making foundry molds which utilizes a mixture of sand and a thermosetting resin, specifically a mixture of phenolic resins and hexamethylenetetramine. More recently, a variation of the process has been developed which is based upon the traditional method of blowing sand cores by means of an air pressure type of blowing machine. In this new method, a mixture of sand and phenolic resin is placed in the charge chamber of a core-blowing machine, and the mix is injected under air pressure into an enclosed heated pattern. The mixture then fills the cavity under pressure and is later cured with the application of heat, so that the surfaces of the mold conform to the interior surfaces of the pattern cavities. There are many advantages to be gained by utilizing the core blowing method in conjunction with the shell mold process. First, internal molds or cores can be produced as well as external molds. In the Croning or dumping process only external molds can be readily formed. Second, shell molds may be produced having a uniform thickness since the sand mixture is blown into a confined or predetermined cavity. In the Croning or dumping process the thickness is determined by the dwell time and temperature conditions, which are difficult to control precisely. Third, both surfaces of the mold can be contoured in the blowing process. In the Croning process only the side in direct contact with the heated pattern can be contoured, and the back part must remain irregular. Since the blown mold is formed in a confined space, a mold possessing 100 percent of definition is produced. Fourth, the amount of the materials needed for producing the core or mold may be more readily determined in the blowing method since the thickness of the mold or core is known in advance. In the Croning process this is not possible as it is impossible to predetermine the exact temperature or dwell time. Fifth, the internal molds or cores may be made hollow by first filling the pattern cavity and then allowing the unused portion to run off. Sixth, since external molds produced by the blowing process can be formed, having a predetermined contour on the reverse side, they can be adapted to the permanent type of mold support. This enables use to be made of positive methods to back up the mold, thus preventing mold fracture during the casting operation.

Other advantages of the blowing process can be seen when the limitations of the Croning process are considered. For instance, in the Croning process, after the mix has been in contact with the heated pattern sufficiently long to form a mold of desired thickness, the pattern and the excess sand are inverted so that the excess sand can fall off. At this point there is a tendency for the mold to fall off the pattern. To prevent this, special resins are used which are less fluid than would normally be desirable. The fall-off of the mold is thus prevented, but the use of a resin that has a lower fluidity results in a finished mold that has less strength than one made with a more fluid resin. When molds are produced by the blowing process, this problem does not exist since the mold is completely contained in the pattern until it has completely cured. Since there is no fall-off problem, resins which are more fluid can be used which in turn produce stronger shell molds.

Another advantage of the blowing method resides in the fact that the method may be used for preparing molds for stack pouring, since both surfaces of the mold may be contoured and cured. Stack molds consist of a cope patterned on one surface and a drag for the succeeding mold on the other surface. The molds are then assembled in groups and may be poured with a common sprue. In the dumping process only one surface may be contoured. As a result it is impossible to produce molds directly for stack pouring.

A saving in time also results through the use of the blowing method since patterns may be filled almost instantaneously and removed from the blowing machinery into a furnace to be cured. In the dumping process the sand mold mixture must remain in contact with the pattern for a sufficient length of time to form a mold of desirable thickness before the excess sand is dumped off and the mold cured.

These many advantages of the blowing process at first could not be realized, since the material used in the dumping or Croning process was not completely suitable for use in blowing shell molds or cores. The molding material as used in the original Croning process consisted of a mixture of sand and finely powdered resins. This mixture was made by placing sand and resin containing admixed hexamethylenetetramine into a mixer and mixing them thoroughly for several minutes. However, since the resin is very finely ground, a problem has always existed in that the finely ground resin tends to disperse through the air when the material is manipulated, creating considerable clouds of dust and destroying the uniformity of the mixture. In U.S. Patent 2,692,246, issued October 19, 1954, to the present applicants, there is disclosed the use of a liquid additive to prevent the resin from being segregated. Although this material in the proportions disclosed and claimed in the aforementioned application aids materially in decreasing the amount of resin dust from blowing around, it still does not produce a material that is entirely suitable for use in the blowing process. When this mix is used the resin still segregates from the sand to some degree during the blowing process, so that when the mixture is carried in the air stream during the blowing process, some of the resin becomes segregated from the sand particles and forms low and high resin concentration areas within the mold, resulting in the production of a weak mold. In the areas where the resin is dense, the mold gases cannot permeate the shell wall, and thus become trapped. This results in the creation of gas pockets in the casting. A quicker burnout may result in these high resin concentration areas to produce a defective casting. Uneven distribution of the resin also results in uneven permeability in the mold. In addition the resin powder has a tendency to concentrate on the pattern surface and at the blow and vent holes. The maximum degree of segregation of resin appears to lie in the most turbulent areas inside the pattern.

In attempting to solve this problem it was discovered that if a resin coating could be applied to each sand particle, there would be no segregation taking place during the blowing process. In addition, it was discovered that a lower percentage of resin could be used in a coated mixture which would still give tensile strength comparable to molds made with uncoated mixtures containing greater percentage of resin.

A number of methods for producing the uniform coating upon the sand particles have been tried by various workers in the field with more or less success. One method consists in mixing the sand with a solution formed by dissolving powdered resin in a solvent, and then driving off the solvent, generally with the addition of heat. One disadvantage of this method is that it is difficult to get the solvent out of the mixture after the mixing process is complete. The solvent evaporates rapidly at first, but, after the viscous stage is reached, the evaporation is accomplished only with extreme difficulty. Another disadvantage of this process is that there is a tendency for the resin to be pulled off the sand particles. This results in a non-uniform mix. Another disadvantage is that the mixture formed remains quite tacky. The cured molds formed have low tensile strength because the resin coating does not adhere well to the sand particles.

The second method uses a series of steps very similar to the traditional process used for producing grinding wheels. A liquid resin is first mixed with sand. Then the powdered resin is added and partially succeeds in drying the mixture. The main disadvantage with this method is that the mixture has green strength, that is, it is quite sticky, lumps, and forms a permanent set when pressure is applied. This makes it very unsatisfactory for use especially in the blowing process where a free-flowing mixture is required. In addition the resin content must be necessarily high in this method in order to achieve suitable tensile strengths in a mold.

A third method, in contrast to the two mentioned above, is a cold-coating method and consists of mixing the sand with a liquid resin and a small amount of solvent. The material is then dried by adding hexamethylenetetramine and wax. The disadvantages of this method are that this material also has green strength and packs, making it unsatisfactory either for normal shell mold use, or for shell mold or core blowing.

The fourth method consists in mixing the sand and the liquid or molten solid resin together at a high temperature, and then adding hexamethylenetetramine to advance the resin. This method is difficult to accomplish and requires expensive equipment for heating the mixing ingredients, which most foundries do not have available. Another disadvantage is that, during the period when the hexamethylenetetramine is added, the resin is continuously being advanced. Therefore, elaborate equipment is required to control the process in order to get a material which is advanced to the same degree as any previous batch which has been made by this process.

In our copending applications, Serial No. 454,701, now United States Patent 2,912,406, and Serial No. 454,702, now United States Patent 2,912,402, there is disclosed a method of producing a resin coating upon sand particles which comprises adding a coating agent such as organic esters of phthalic or phosphoric acids to the sand, adding a powdered phenolic resin, and then mixing the materials until the sand particles become coated. This process has proved itself to be very useful in commercial practice. However, in this process, the coating agent remains within the resin after the process has been completed. This may be undesirable for many applications since the coating agent has a plasticizing effect that may cause the final molded product to be insufficiently rigid.

It is an object of the present invention to provide a process for the production of molding compositions wherein the inert filler particles are uniformly coated with a phenolic resin composition. It is a further object of the present invention to provide such a process which may be carried out at room temperature. It is also an object of the invention to provide a resin coating process which may be carried out at room temperature wherein the coating agent is not retained in the resin when the process has been completed.

It is also an object of the present invention to provide a method for the production of a resin coated sand suitable for the shell molding processes which may be carried out at room temperature in the various mixing apparatuses generally found in foundries. It is an additional object of the invention to provide a process for the production of resin coated sand which is free-flowing, non-segregating, and which may be used in the shell mold blowing process.

It is a further object of the invention to provide a process for the coating of phenolic resins upon abrasive grit for use in the grinding wheel industry. Further objects and advantages of this invention will appear more fully from the following description.

It has now been found that a coating of a phenolic resin upon inert filler particles such as foundry sand and abrasive grit may be effected at room temperature by using as a coating agent a mixture of water and a volatile organic liquid which is a solvent for the resin, and is miscible in water.

The organic solvent may be any one of a large number of materials, among which are acetone, methyl ethyl ketone, methanol, isopropyl alcohol, n-propyl alcohol, methyl acetate etc. There are three necessary properties which it must exhibit. First, it must be miscible in water. Second, it must be a solvent for the phenolic resin. Third, its vapor pressure must be higher than that of water.

The process is carried out by placing the phenolic resin, which contains sufficient hexamethylenetetramine to render it thermosetting, and the inert filler particles in a mixer such as a muller. The mixer is started and the ingredients are allowed to mix for a brief period. The coating agent is then added in the form of a stream and the mixing process allowed to continue. The coating agent first softens the resin to the point where the mixture becomes somewhat sticky and lumpy. As mixing continues the discrete particles of the filler become gradually coated with the softened resin, and the mixture eventually becomes non-tacky and free-flowing. The organic liquid volatilizes during the mixing and eventually is almost completely evaporated. The water is then evaporated and when mixing is complete, a substantially dry mixture results. The material before use is preferably screened to break up any remaining lumps and to provide aeration to remove the last traces of the coating agent. The material is then ready for use.

The proportion of the organic solvent in the coating agent may vary in a range from about 30 percent organic solvent to about 95 percent organic solvent. When the percentage of the organic solvent falls below about 30 percent, the coating is not satisfactory. When it goes above about 95 percent, coating will take place but the solvent is removed from the resin only with difficulty and prolonged drying.

When methanol, ethanol, isopropanol or acetone are used, the preferred proportion is about 75 percent of the organic solvent and about 25 percent water. When other solvents are used it may be necessary to vary the proportion somewhat for optimum results.

The amount of coating agent used will vary in general with the amount of resin used, the type of resin, and the type of sand used. In some cases the ratio of the coating agent to the resin may be as low as 0.10 to 1 and form a satisfactory coating. On the other hand, a ratio as high as 1.5 to 1 may be used where the resin is not very soluble in the coating agent. The preferred ratio of coating agent to resin for most uses is from about 0.25 to 1 and 0.75 to 1.

Conventional mold lubricants may be used such as calcium stearate, Carnauba wax, Montan wax, etc. These materials act not only as a mold release agent, but also aid the final product to become non-packing. The lubricant may be used in amounts of from about 0.5 percent to about 10 percent by weight based on the phenolic resin. A preferred amount is 7.5 percent. It may be added with the resin mixture at the beginning of the mixing period, added separately during the mixing and while the coating process is in progress, or added after the coating has been accomplished and introduced by mixing the mold lubricant with the already coated filler.

The following examples illustrate the present invention and the improvements.

EXAMPLE 1

(A) A charge to a reaction flask of 1,000 grams of phenol and 10 grams of sulfuric acid was heated to a temperature of 100 degrees centigrade at which point 650 grams of aqueous 37 percent by weight formaldehyde were then slowly added. After the addition of the formaldehyde the mixture was refluxed for about 40 to 45 minutes. The acid was then neutralized with 7.5 grams of calcium hydroxide in a slurry. The mixture was dehydrated under reduced pressure in the usual manner. The resin was cooled and ground to small particles.

(B) Three hundred grams of the resin prepared above in (A) were then mixed with 45 grams of hexamethylenetetramine by weight based on the resin and pulverized.

This mixture was then placed into a Simpson muller together with 25 pounds of foundry sand, and mixed for a short time. A mixture of 50 grams of ethyl alcohol and 20 grams of water was added to this mixture and mixing was continued for about 16 minutes until the lumping was eliminated. This material was then screened to break up any remaining particles and to aerate the mixture. The resulting coated sand was free-flowing and no tendency was exhibited by the resin to segregate. Test pieces were prepared by the shell mold process, cured in an oven at a temperature of 450 degrees Fahrenheit for four minutes and tested for tensile strength on a Dietert tensilometer. The pieces had a tensile strength of about 350 pounds per square inch.

EXAMPLE 2

(A) A charge of 1,000 grams of phenol, 10 grams of sulfuric acid and 100 grams crude salicyclic acid was placed in a reaction flask. The temperature of the mixture was raised to 100 degrees centigrade and 650 grams of aqueous 37 percent by weight formaldehyde were slowly added. After the formaldehyde had been completely added the mixture was refluxed for an additional 45 minutes. The sulfuric acid was then neutralized with 8.7 grams lime in a slurry of 20 grams water. The resin was then dehydrated and cooled. The brittle resin which formed upon cooling was ground, mixed with 15 percent by weight hexamethylenetetramine and 7 percent by weight calcium stearate, and the mixture pulverized.

(B) Two and one-half pounds of the resin produced above in (A) were then placed together with 100 pounds of Wedron No. 60 foundry sand in a muller and mixed together for several minutes. While mixing continued a solution containing 300 grams ethyl alcohol and 100 grams water was added in a stream. Mixing was continued for about 20 minutes, at which time the mixture was almost free of lumps. This mixture was then put through a screen in order to break up any small lumps remaining and to provide aeration. The material was non-tacky, free-flowing and contained no discrete resin particles. Test pieces were then made from this material and tested on a Dietert tensilometer as described above in Example 1(B). The tensile strength obtained was 517 pounds per square inch.

EXAMPLE 3

In order to test the effectiveness of the coating method of the present invention in preparation of coated abrasive grit for use in making grinding wheels, a mixture was prepared by methods similar to those given above. In each of the examples given below in Table I the abrasive grit was mixed with a resin binder in a Simpson muller for about one minute. Then in order to achieve a uniform resin binder coating about each abrasive grain particle, a mixture of three parts methyl alcohol and one part water was added and mixed for about three minutes. When the mixture became tacky and lumpy, it was removed from the muller and air-dried for four to five minutes. It was then returned to the muller and mixing was carried on for an additional five minutes until the grains were free-flowing. The resin coated grit was then screened to remove or break up any remaining lumps. Test pieces were then prepared by molding the material so prepared on the test pattern at a temperature of 375 degrees Fahrenheit and then curing for four minutes at 450 degrees Fahrenheit in an oven.

Table I shows the results obtained by using the coated material thus prepared with various types of abrasive grit. In every example, the resin binder had the following composition: 13 parts salicylic acid; 100 parts of a two-step [novolak] *novolac* resin such as described above in Example 1(A); 10 parts hexamethylenetramine; one part magnesol, which consists of synthetic anhydrous silicate; and 7.5 parts calcium stearate.

Table I

| | Grit | Resin Binder, lbs. | Ethanol, grams | Water, grams | Tensile Strength, p.s.i. |
|---|---|---|---|---|---|
| Example 4 | Lionite 120 (Aluminum oxide), 29.5 pounds. | 1.18 | 75 | 25 | 550 |
| Example 5 | Carborundum 36WPH3 (Aluminum oxide), 29.5 pounds. | 1.78 | 75 | 25 | 250 |
| Example 6 | Carborundum, 120SGM. | 1.78 | 100 | 33 | 980 |

The following examples illustrate the use of solvents other than ethanol. In every case the material is made using the materials, proportions and methods of Example 2. Test pieces were prepared as above and tested on a Dietert tensilometer.

Table II

| | Organic Liquid | Water, gms. | Sand, lbs. | Resin Compos., lb. | Tensile Strength in Lbs./square inch |
|---|---|---|---|---|---|
| Example 7 | Acetone, 78 gms. | 52 | 25 | 1 | 353 |
| Example 8 | Wood Distillate, 100 gms. | 33 | 25 | 1 | 443 |
| Example 9 | Isopropyl Alcohol, 75 gms. | 20 | 25 | ½ | 409 |

The wood distillate used in Example 8 above comprises 47.5 to 51 percent acetone, 27.5 to 31 percent methyl acetate and 25 to 20 percent methyl alcohol.

Although the present invention has been described with a certain degree of particularity, it is understood that the present disclosure has been made only by way of example and that numerous changes in detail and composition and procedure may be resorted to without departing from the spirit and scope of the invention as hereinafter claimed.

We claim:

1. A process for the production of discrete, free-flowing inert filler particles coated with a potentially thermosetting phenolic resin composition which comprises mixing together (A) said inert filler particles, (B) a comminuted [phenolic] *novolac* resin in an amount from about 1 to about 35 percent by weight of the total composition which comprises the reaction product of between about 0.5 and about 0.85 mole formaldehyde per mole of phenol, (C) hexamethylenetetramine in an amount sufficient to render said [phenolic] *novolac* resin (B) thermosetting, and (D) a coating agent comprising (1) water and (2) a volatile organic solvent having a vapor pressure higher than that of water and which is a mutual solvent for both said [phenolic] *novolac* resin (B) and water, said volatile organic solvent being selected from the group consisting of methyl alcohol, ethyl alcohol, isopropyl alcohol, n-propyl alcohol, acetone, methyl ethyl ketone, methyl acetate and mixtures thereof, wherein the amount of organic solvent (2) is from about 35 to about 95 percent by weight of said coating agent (D) and the ratio by weight of said coating agent (D) to said [phenolic] *novolac* resin (B) is from about 0.1 to 1 and 2 to 1; and continuing the mixing until said resin-coated inert filler particles become substantially dry and free-flowing.

2. A process according to claim [1] *17* wherein said volatile organic solvent is methyl alcohol.

3. A process according to claim [1] *17* wherein said volatile organic solvent is ethyl alcohol.

4. A process according to claim [1] *17* wherein said volatile organic solvent is isopropyl alcohol.

5. A process according to claim [1] *17* wherein said volatile organic solvent is acetone.

6. A process according to claim [1] *17* wherein said volatile organic solvent is a mixture of acetone, methyl alcohol, and methyl acetate.

7. A process according to claim [1] *17* wherein said inert filler particles are sand grains.

8. A process according to claim [1] *17* wherein said inert filler particles are abrasive grit.

9. A process according to claim [1] *17* wherein said inert filler particles are sand grains and said volatile organic solvent is methyl alcohol.

10. A process according to claim [1] *17* wherein said inert filler particles are sand grains and said volatile liquid is ethyl alcohol.

11. A process according to claim [1] *17* wherein said inert filler particles are sand grains and said volatile organic solvent is acetone.

12. A process according to claim [1] *17* wherein said inert filler particles are abrasive grit and said volatile organic solvent is methyl alcohol.

13. A process according to claim [1] *17* wherein said inert filler particles are abrasive grit and said volatile organic solvent is ethyl alcohol.

[14. A process according to claim 1 wherein said inert filler particles are abrasive grit and said volatile organic solvent is acetone.]

15. A process according to claim [1] *17* wherein the ratio by weight of said coating agent (D) to said [phenolic] *novolac* resin (B) is from about 0.25 to 1 and 0.75 to 1.

16. A process according to claim [1] *17* wherein said inert filler particles are sand grains, said volatile inorganic liquid is ethyl alcohol, and the ratio by weight of said coating agent (D) to said [phenolic] *novolac* resin (B) is from about 0.25 to 1 and 0.75 to 1.

*17. A process for the production of discrete, free-flowing inert filler particles coated with a potentially thermosetting phenolic resin composition which comprises mixing together (A) said inert filler particles, (B) a novolac resin in an amount from about 1 to about 35 percent by weight of the total composition which comprises the reaction product of between about 0.5 and about 0.85 mole formaldehyde per mole of phenol, (C) hexamethylenetetramine in an amount sufficient to render said novolac resin (B) thermosetting, and (D) a coating agent comprising (1) water and (2) a volatile organic solvent having a vapor pressure higher than that of water and which is a mutual solvent for both said novolac resin (B) and water, said volatile organic solvent being selected from the group consisting of methyl alcohol, ethyl alcohol, isopropyl alcohol, n-propyl alcohol, acetone, methyl ethyl ketone, methyl acetate and mixtures thereof, wherein the amount of organic solvent (2) is from about 35 to about 95 percent by weight of said coating agent (D) and the ratio by weight of said coating agent (D) to said novolac resin (B) is from about 0.1 to 1 and 2 to 1; and continuing the mixing until said resin-coated inert filler particles become substantially dry and free-flowing.*

*18. A process for the production of discrete, free-flowing inert filler particles coated with a potentially thermosetting phenolic resin composition which comprises mixing together (A) said inert filler particles, (B) particles of novolac resin in an amount from about 1 to about 35 percent by weight of the total composition which comprises the reaction product of between about 0.5 and about 0.85 mole formaldehyde per mole of phenol, (C) hexamethylenetetramine in an amount sufficient to render said novolac resin (B) thermosetting, and (D) a coating agent comprising (1) water and (2) a volatile organic solvent having a vapor pressure higher than that of water and which is a mutual solvent for both said novolac resin (B) and water, said volatile organic solvent being selected from the group consisting of methyl alcohol, ethyl alcohol, isopropyl alcohol, n-propyl alcohol, acetone, methyl ethyl ketone, methyl acetate and mixtures thereof, where-*

*in the amount of organic solvent (2) is from about 35 to about 95 percent by weight of said coating agent (D) and the ratio by weight of said coating agent (D) to said novolac resin (B) is from about 0.1 to 1 and 2 to 1; and continuing the mixing until said resin-coated inert filler particles become substantially dry and free-flowing.*

References Cited by the Examiner

The following references, cited by the examiner, are of record in the patented file of this patent or the original patent

UNITED STATES PATENTS

| | | | |
|---|---|---|---|
| 2,674,589 | 4/54 | Coleman et al. | 260—57 |
| 2,702,758 | 2/55 | Uhlig et al. | 117—4 |
| 2,708,622 | 5/55 | Stone | 260—38 |
| 2,807,556 | 9/57 | Stark | 117—100 |

| | | | |
|---|---|---|---|
| 2,829,982 | 4/58 | Hoyt | 117—10 |
| 2,836,867 | 6/58 | Bean | 260—3 |

FOREIGN PATENTS

| | | |
|---|---|---|
| 353,070 | 7/31 | Great Britain. |
| 571,159 | 8/45 | Great Britain. |
| 138,705 | 9/50 | Australia. |

OTHER REFERENCES

Journal American Chemical Society, 1901, 23, page 463–468.

Ind. and Eng. Chemistry, 1949, 41, pages 2347 t 2351.

WILLIAM D. MARTIN, *Primary Examiner.*

RICHARD D. NEVIUS, *Examiner.*